US012628067B2

(12) United States Patent
Kim et al.

(10) Patent No.: US 12,628,067 B2
(45) Date of Patent: May 12, 2026

(54) ACCESS TO SNPN BY USING CREDENTIAL OWNED BY ENTITY SEPARATED FROM SNPN, AND SUPPORT FOR F1 INTERFACE THEREFOR

(71) Applicant: LG Electronics Inc., Seoul (KR)

(72) Inventors: Seokjung Kim, Seoul (KR); Myungjune Youn, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 18/017,267

(22) PCT Filed: Jul. 8, 2021

(86) PCT No.: PCT/KR2021/008709
§ 371 (c)(1),
(2) Date: Jan. 20, 2023

(87) PCT Pub. No.: WO2022/019537
PCT Pub. Date: Jan. 27, 2022

(65) Prior Publication Data
US 2023/0284119 A1 Sep. 7, 2023

(30) Foreign Application Priority Data

Jul. 20, 2020 (KR) ........................ 10-2020-0089726

(51) Int. Cl.
*H04W 48/08* (2009.01)
*H04W 48/02* (2009.01)
*H04W 48/18* (2009.01)

(52) U.S. Cl.
CPC ........... *H04W 48/08* (2013.01); *H04W 48/02* (2013.01); *H04W 48/18* (2013.01)

(58) Field of Classification Search
CPC ..... H04W 48/08; H04W 48/02; H04W 48/18; H04W 60/00; H04W 84/10
(Continued)

(56) References Cited

U.S. PATENT DOCUMENTS 11,490,291 B2 * 11/2022 Talebi Fard ...... H04W 36/0016
11,743,063 B2 * 8/2023 Qiao ..................... H04W 76/11
370/329
(Continued)

FOREIGN PATENT DOCUMENTS

WO WO 2020/036364 2/2020
WO WO 2020/072657 4/2020
WO WO 2020/102292 5/2020

OTHER PUBLICATIONS

3GPP, "3rd Generation Partnership Project; Technical Specification Group Services and System Aspects; Study on enhanced support of non-public networks (Release 17)," TR 23. 700-07 V0.4.0, Jun. 2020, 159 pages.
(Continued)

*Primary Examiner* — Chi Tang P Cheng
*Assistant Examiner* — Michael Wayne Maddox
(74) *Attorney, Agent, or Firm* — Fish & Richardson P.C.

(57) ABSTRACT

Provided are a method and apparatus for: access to a stand-alone non-public network (SNPN) by using credential owned by an entity separated from the SNPN; and support for an F1 interface therefor. User Equipment (UE) operating in a wireless communication system receives system information from the stand-alone non-public network (SNPN). The system information includes information about whether or not the SNPN supports underconfigured UE. The UE transmits a first registration request message to the SNPN, on the basis of the information about whether or not to support the underconfigured UE, and receives, from the SNPN, a registration reject message as a response to same.

(Continued)

Receive system information from a SNPN / the system information includes information about whether the SNPN supports an underconfigured UE / the underconfigured UE is a UE that has not received through a pre-configuration which SNPN can be selected to receive a service from a home SP —S1000

Transmit a first registration request message to the SNPN based on the information about whether the SNPN supports the underconfigured UE / the first registration request message includes an ID of a home SP from which the UE intends to receive service —S1010

Receive a registration reject message from the SNPN in response to the first registration request message / the registration reject message includes information about home SPs supported by the SNPN —S1020

Select at least one home SP from which the UE intends to receive service from among the home SPs supported by the SNPN —S1030

Transmit a second registration request message including an ID of the selected home SP to the SNPN —S1040

The registration reject message includes information about home SPs supported by the SNPN. The UE performs registration by selecting at least one home SP from which the UE desires to receive a service from among the home SPs supported by the SNPN.

7 Claims, 15 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0245235 | A1* | 7/2020 | Chun ..................... | H04W 48/18 |
| 2021/0058784 | A1* | 2/2021 | Kedalagudde ........ | H04W 76/12 |
| 2021/0211975 | A1* | 7/2021 | Prabhakar .............. | H04W 8/06 |
| 2021/0345226 | A1* | 11/2021 | Liao ...................... | H04W 48/18 |
| 2021/0410059 | A1* | 12/2021 | Talebi Fard .......... | H04W 40/02 |
| 2023/0164726 | A1* | 5/2023 | Kuge .................... | H04W 48/18 |
| | | | | 455/435.1 |
| 2023/0189187 | A1* | 6/2023 | Velev ................... | H04W 48/16 |
| | | | | 455/435.1 |
| 2023/0247543 | A1* | 8/2023 | Kuge .................... | H04W 60/04 |
| | | | | 370/329 |
| 2024/0224163 | A1* | 7/2024 | Starsinic .............. | H04W 60/04 |

OTHER PUBLICATIONS

3GPP, "3rd Generation Partnership Project; Technical Specification Group Services and System Aspects; System architecture for the 5G System (5GS); Stage 2 (Release 16)," TS 23.501 V16.3.0, Dec. 2019, 417 pages.

3GPP, "3rd Generation Partnership Project; Technical Specification Group Services and System Aspects; System architecture for the 5G System (SGS); Stage 2 (Release 16)," 441 pages.

3GPP, "3rd Generation Partnership Project; Technical Specification Group Services and System Aspects; Procedures for the 5G System (5GS); Stage 2 (Release 16)," TS 23.502 V16.3.0, Dec. 2019, 558 pages.

Huawei & HiSilicon, "Solution #X: UE Onboarding and Provisioning for a PNI-NPN," S2-2001535 (revision of S2-2001482), Presented at SA WG2 Meeting #136AH, Incheon, South Korea, Jan. 13-17, 2020, 5 pages.

Intel, "KI #1, New Sol: Solution #1 plus support for UEs that do not have sufficient information for SNPN selection," S2-2004024 (revision of S2-200xxxx), Presented at SA WG2 Meeting #S2-139-e, Jun. 1-12, 2020, Electronic meeting, 3 pages.

OPPO, "KI#1, Sol#2 Update: Service Provider Identifier in UE configuration data," S2-2003725, Presented at 3GPP TSG SA WG2 Meeting #139E, Elbonia, Jun. 1-12, 2020, 7 pages.

Qualcomm Incorporated & Sennheiser, "Solution for SNPN access using 3rd party credentials," S2-2001527, Presented at 3GPP TSG-SA WG2 Meeting #136-AH, Incheon, Korea (Republic Of), Jan. 13, 2020-Jan. 17, 2020, 6 pages.

* cited by examiner

Figure 2:
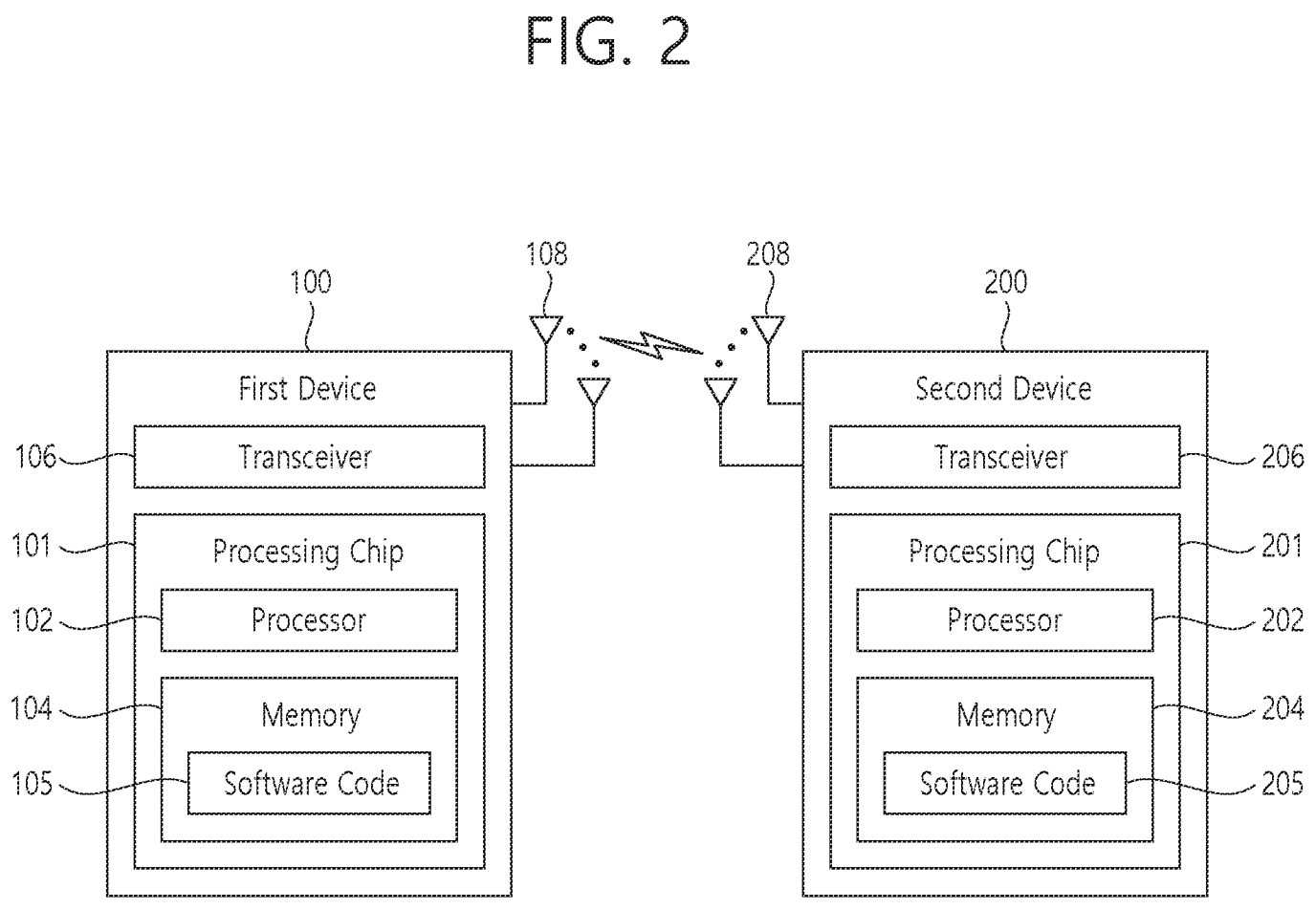

First Device 100

Transceiver 106

Processing Chip 101

Processor 102

Memory 104

Software Code 105

108

208

Second Device 200

Transceiver 206

Processing Chip 201

Processor 202

Memory 204

Software Code 205

FIG. 3

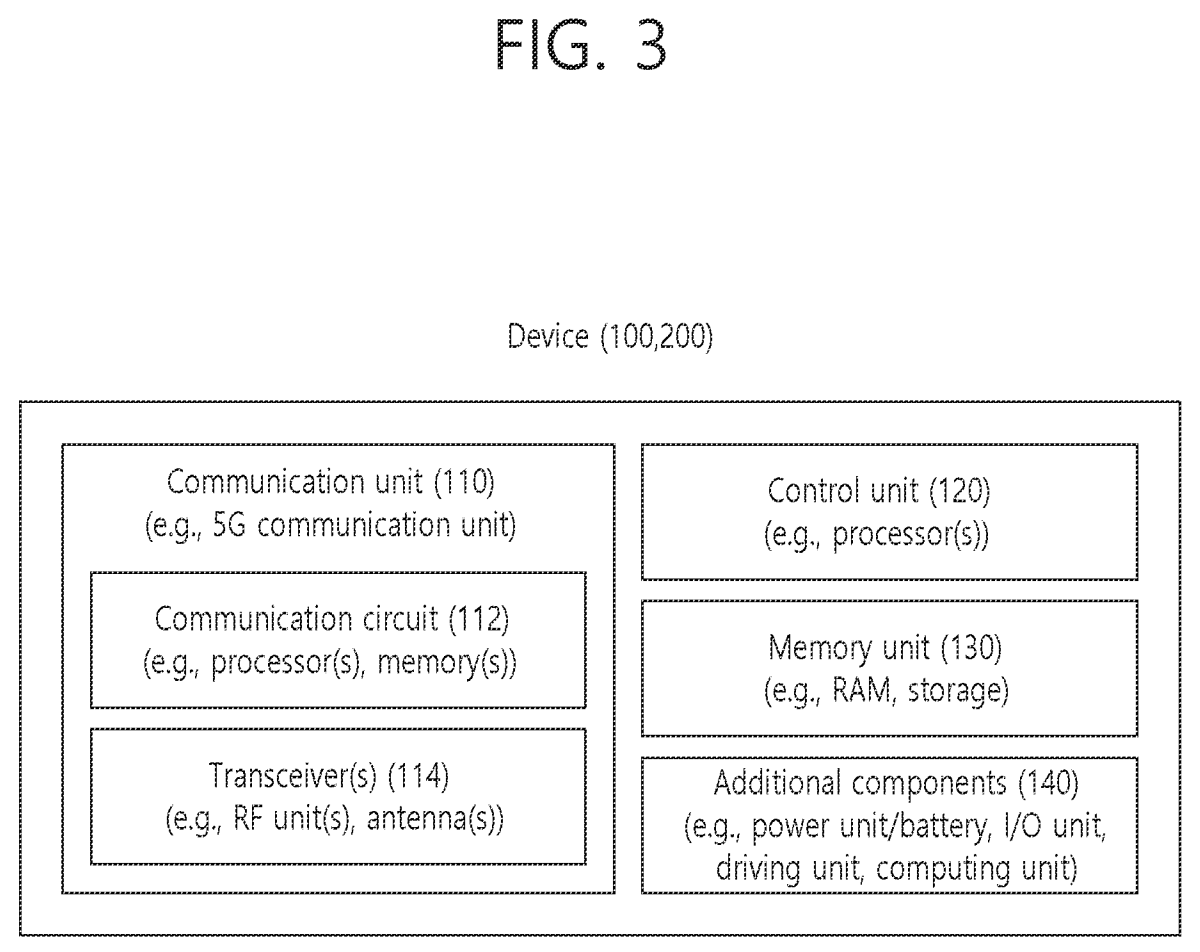

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

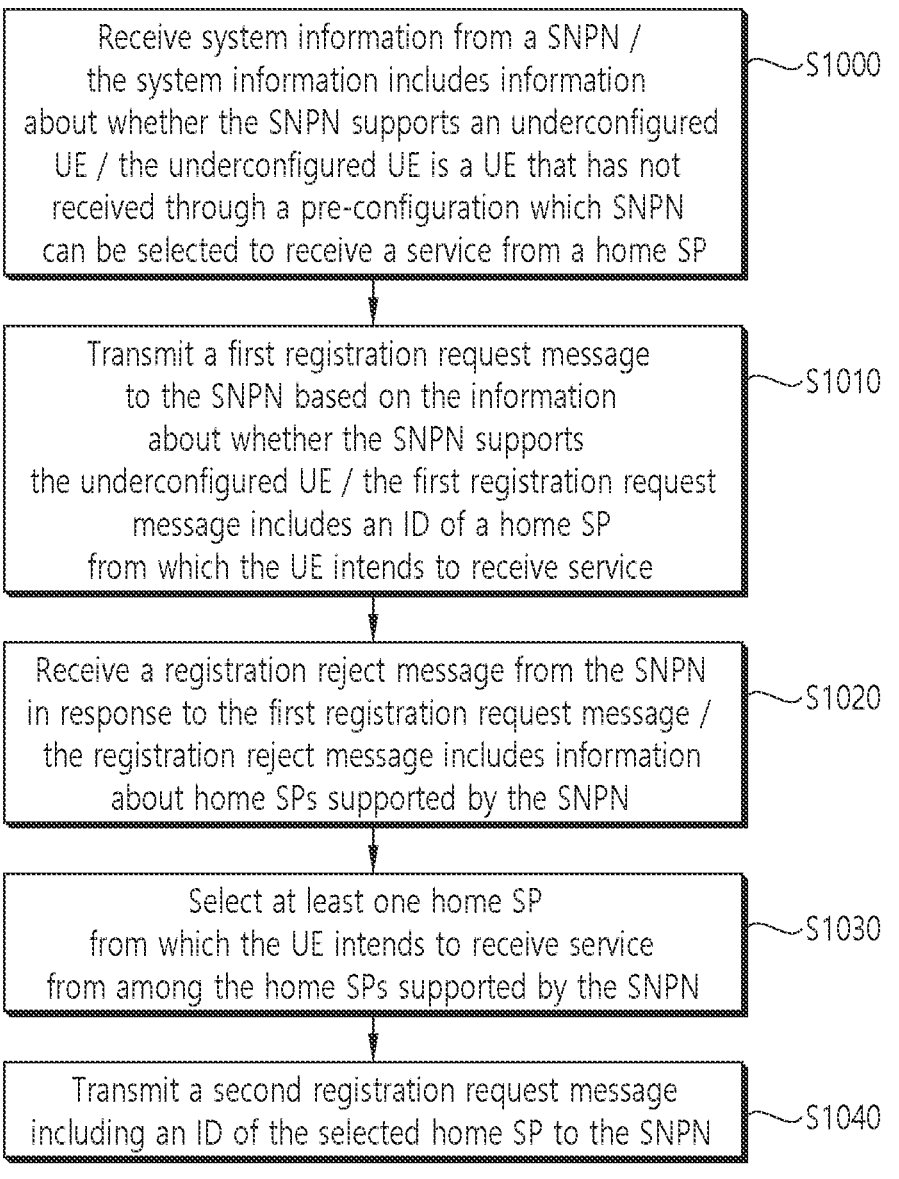

Receive system information from a SNPN /
the system information includes information
about whether the SNPN supports an underconfigured
UE / the underconfigured UE is a UE that has not
received through a pre-configuration which SNPN
can be selected to receive a service from a home SP ~~S1000

Transmit a first registration request message
to the SNPN based on the information
about whether the SNPN supports
the underconfigured UE / the first registration request
message includes an ID of a home SP
from which the UE intends to receive service ~~S1010

Receive a registration reject message from the SNPN
in response to the first registration request message /
the registration reject message includes information
about home SPs supported by the SNPN ~~S1020

Select at least one home SP
from which the UE intends to receive service
from among the home SPs supported by the SNPN ~~S1030

Transmit a second registration request message
including an ID of the selected home SP to the SNPN ~~S1040

FIG. 11

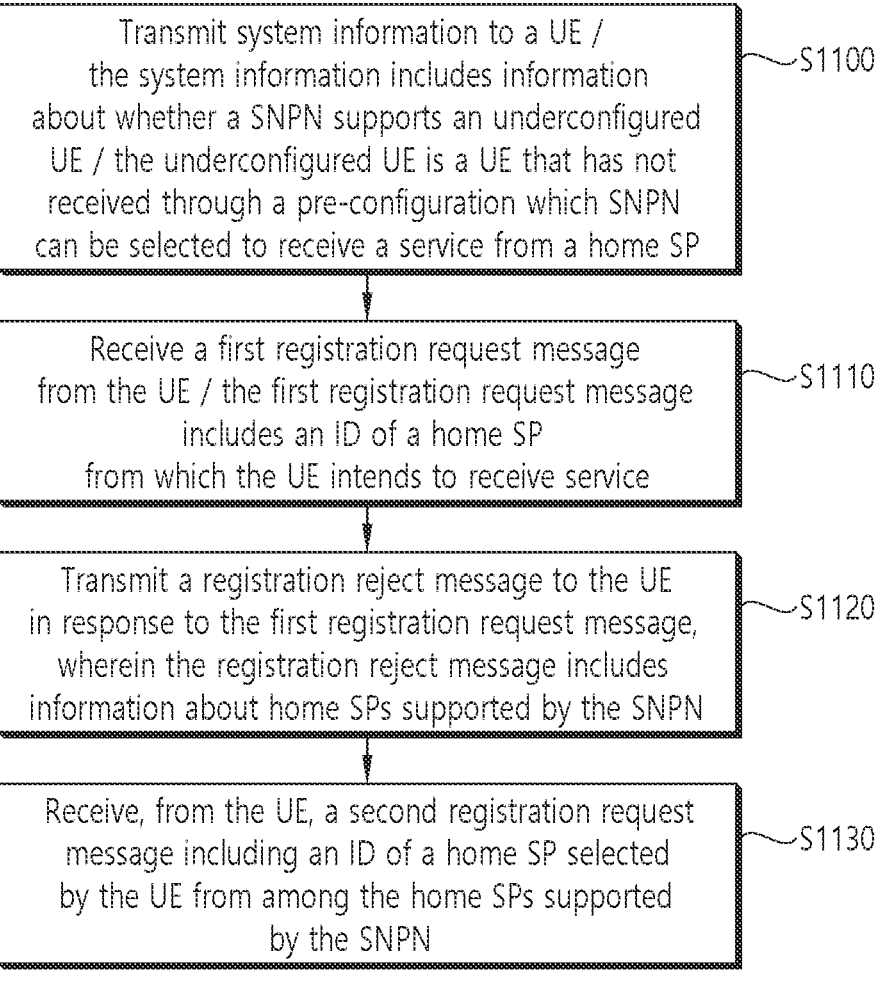

Transmit system information to a UE /
the system information includes information
about whether a SNPN supports an underconfigured
UE / the underconfigured UE is a UE that has not
received through a pre-configuration which SNPN
can be selected to receive a service from a home SP ~S1100

Receive a first registration request message
from the UE / the first registration request message
includes an ID of a home SP
from which the UE intends to receive service ~S1110

Transmit a registration reject message to the UE
in response to the first registration request message,
wherein the registration reject message includes
information about home SPs supported by the SNPN ~S1120

Receive, from the UE, a second registration request
message including an ID of a home SP selected
by the UE from among the home SPs supported
by the SNPN ~S1130

FIG. 14 gNB-DU gNB-CU

Figure 14:
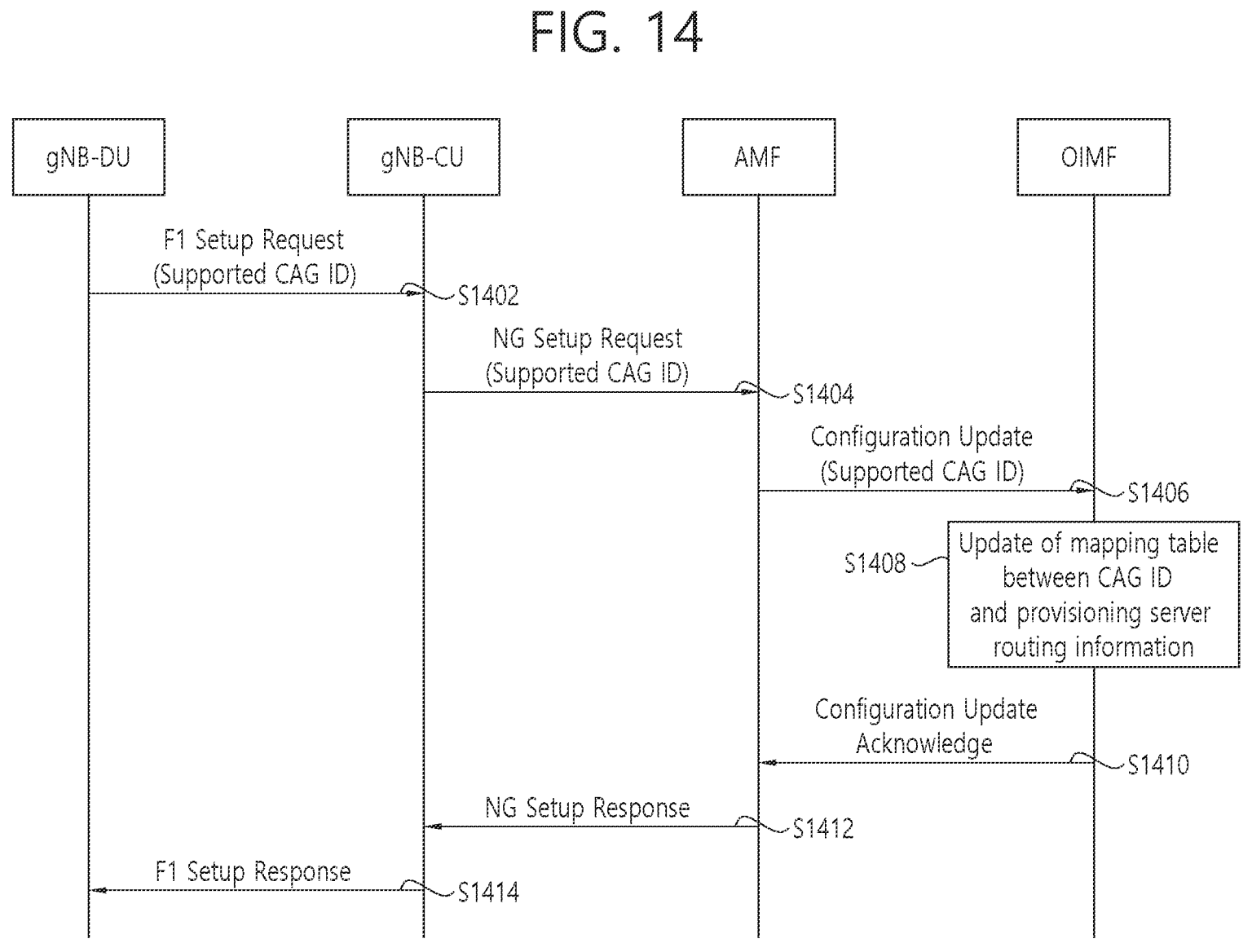

AMF

OIMF

S1402

F1 Setup Request
(Supported CAG ID)

S1404

NG Setup Request
(Supported CAG iD)

S1406

Configuration Update
(Supported CAG ID)

S1408

Update of mapping table
between CAG ID
and provisioning server
routing information

S1410

Configuration Update
Acknowledge

S1412

NG Setup Response

S1414

F1 Setup Response

ACCESS TO SNPN BY USING CREDENTIAL OWNED BY ENTITY SEPARATED FROM SNPN, AND SUPPORT FOR F1 INTERFACE THEREFOR

CROSS-REFERENCE TO RELATED APPLICATIONS

This application is a National Stage application under 35 U.S.C. § 371 of International Application No. PCT/KR2021/008709, filed on Jul. 8, 2021, which claims the benefit of Korean Patent Application No. 10-2020-0089726, filed on Jul. 20, 2020. The disclosures of the prior applications are incorporated by reference in their entirety.

TECHNICAL FIELD

The present disclosure relates to stand-alone non-public network (SNPN) access using credentials owned by a separate entity from SNPN and support for an F1 interface therefor.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Non-public networks (NPN) are intended for the sole use of a private entity such as an enterprise, and may be deployed in a variety of configurations, utilizing both virtual and physical elements. Specifically, they may be deployed as completely standalone networks, they may be hosted by a public land mobile network (PLMN), or they may be offered as a slice of a PLMN.

In any of these deployment options, it is expected that unauthorized user equipments (UEs), those that are not associated with the enterprise, will not attempt to access the non-public network, which could result in resources being used to reject that UE and thereby not be available for the UEs of the enterprise. It is also expected that UEs of the enterprise will not attempt to access a network they are not authorized to access. For example, some enterprise UEs may be restricted to only access the non-public network of the enterprise, even if PLMN coverage is available in the same geographic area. Other enterprise UEs may be able to access both a non-public network and a PLMN where specifically allowed.

SUMMARY

A method in which a UE accesses an NPN and a service of a network (e.g., a home service provider (SP)) separated from the NPN is supported through the NPN is being discussed. In this case, a UE that does not have enough information may unnecessarily and repeatedly transmit a registration request to the network in order to receive service from a specific home SP.

In an aspect, a method performed by a user equipment (UE) operating in a wireless communication system is provided. The method comprises receiving system information from a stand-alone non-public network (SNPN). The system information includes information about whether the SNPN supports an underconfigured UE. The underconfigured UE is a UE that has not received through a pre-configuration which SNPN can be selected to receive a service from a home service provider (SP). The method further comprises transmitting a first registration request message to the SNPN based on the information about whether the SNPN supports the underconfigured UE. The first registration request message includes an identifier (ID) of a home SP from which the UE intends to receive service. The method further comprises receiving a registration reject message from the SNPN in response to the first registration request message. The registration reject message includes information about home SPs supported by the SNPN. The method further comprises selecting at least one home SP from which the UE intends to receive service from among the home SPs supported by the SNPN, and transmitting a second registration request message including an ID of the selected home SP to the SNPN.

In another aspect, an apparatus for implementing the above method is provided.

The present disclosure may have various advantageous effects.

For example, a network (e.g., a stand-alone non-public network (SNPN)) can inform a user equipment (UE) of a list other networks (home service provider (SP) ID list) capable of providing services through a SNPN by establishing an SLA with the corresponding SNPN. Accordingly, the UE can avoid continuously requesting registration with a SNPN that cannot provide services of a specific home SP.

For example, routing information for the provisioning server can be updated according to a closed access group (CAG) ID supported by the wireless network, or, conversely, the CAG ID configured in the provisioning server can be transmitted to the UE. Accordingly, the UE can select a provisioning server for onboarding according to the CAG 1D informed by the wireless network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 6 shows an example of 5G system architecture to which implementations of the present disclosure is applied.

FIGS. 7 and 8 show an example of a registration procedure to which implementations of the present disclosure is applied.

FIG. 10 shows an example of a method performed by a UE to which the first implementation of the present disclosure is applied.

FIG. 11 shows an example of a method performed by a base station to which the first implementation of the present disclosure is applied.

FIG. 14 shows an example of a method of updating a mapping table between a CAG ID and provisioning server routing information in an OIMF initiated by a gNB according to the third implementation of the present disclosure.

DETAILED DESCRIPTION

Figure 4:
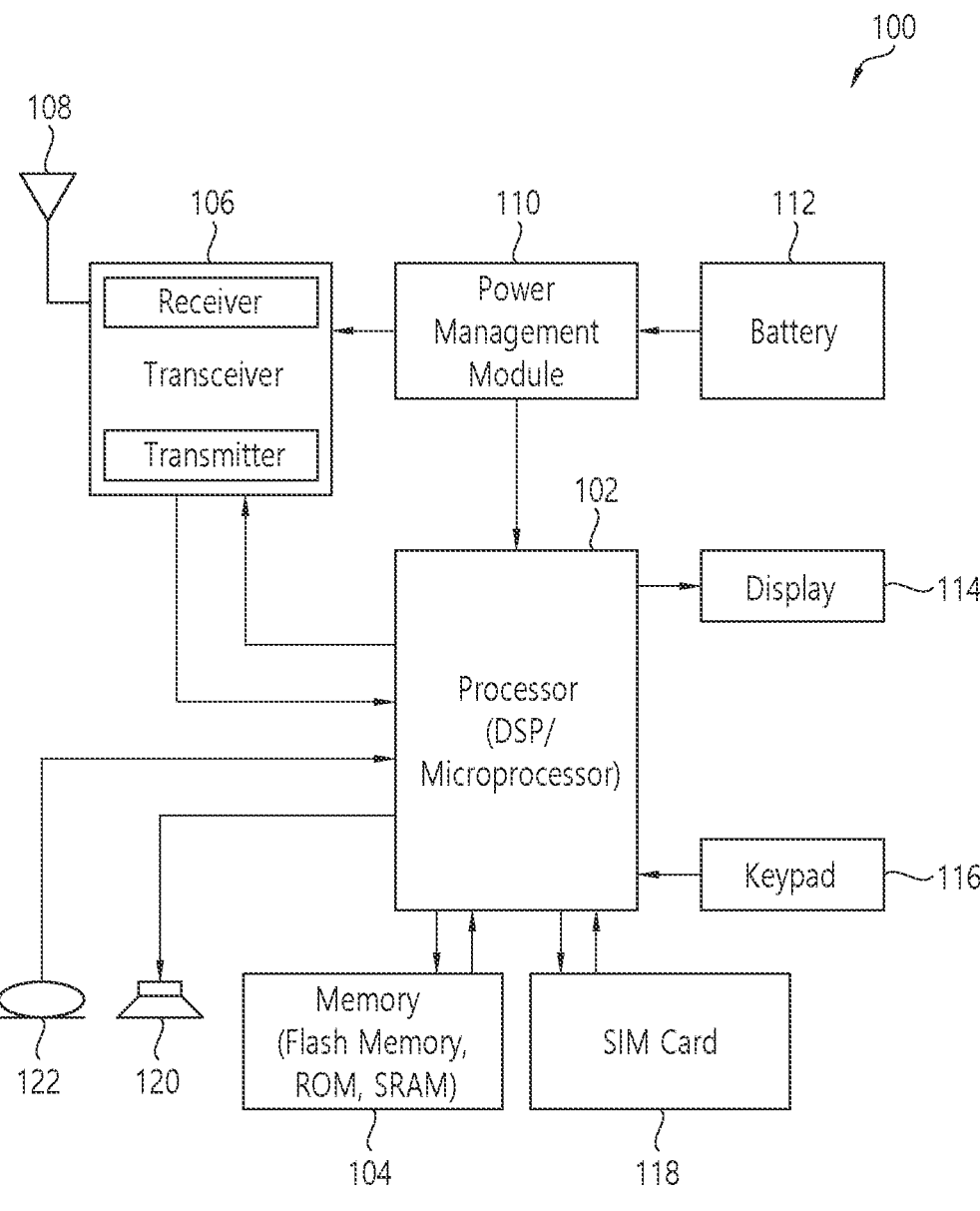
FIG. 4 shows an example of UE to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi- Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
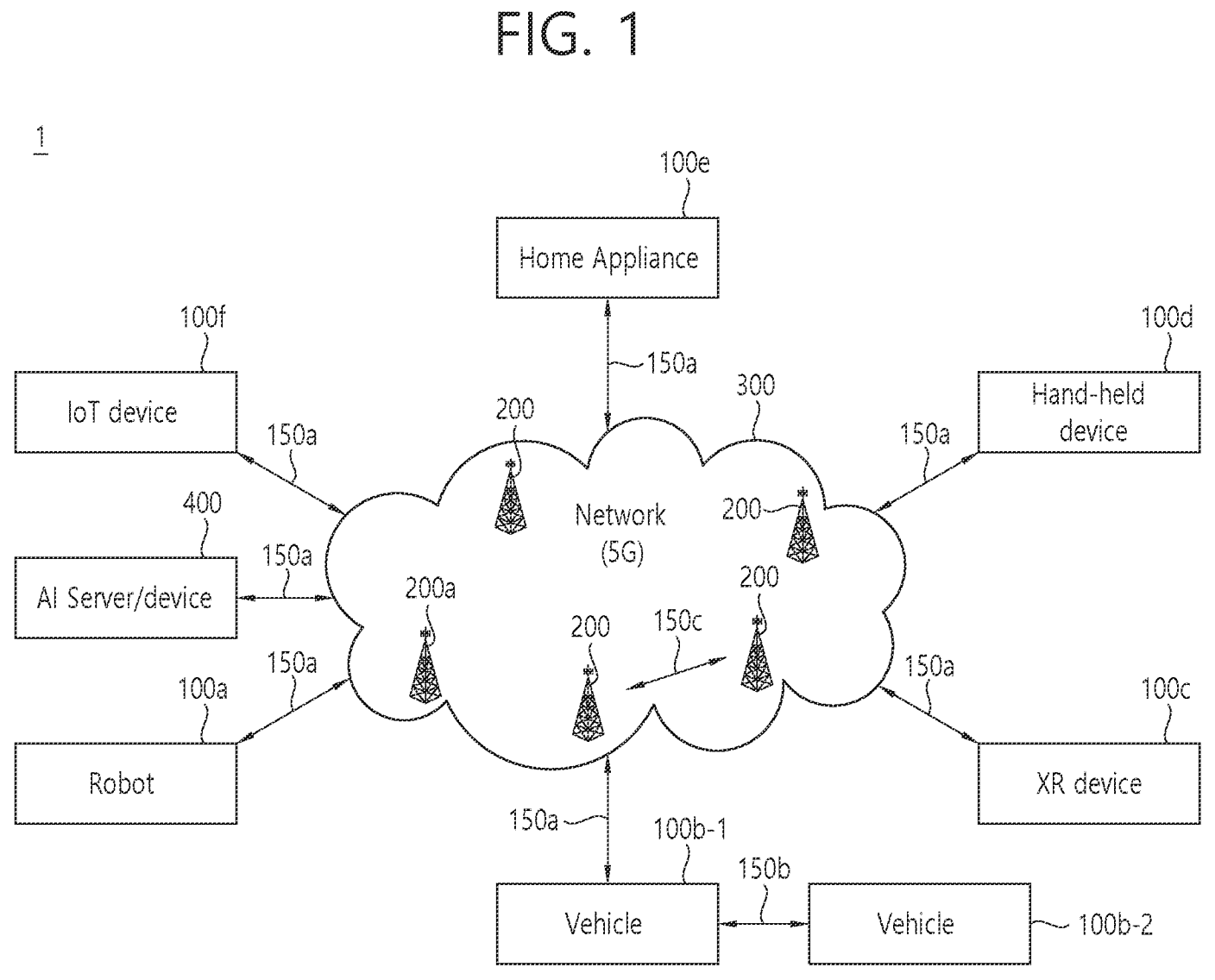

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world.

The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee. Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/ mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
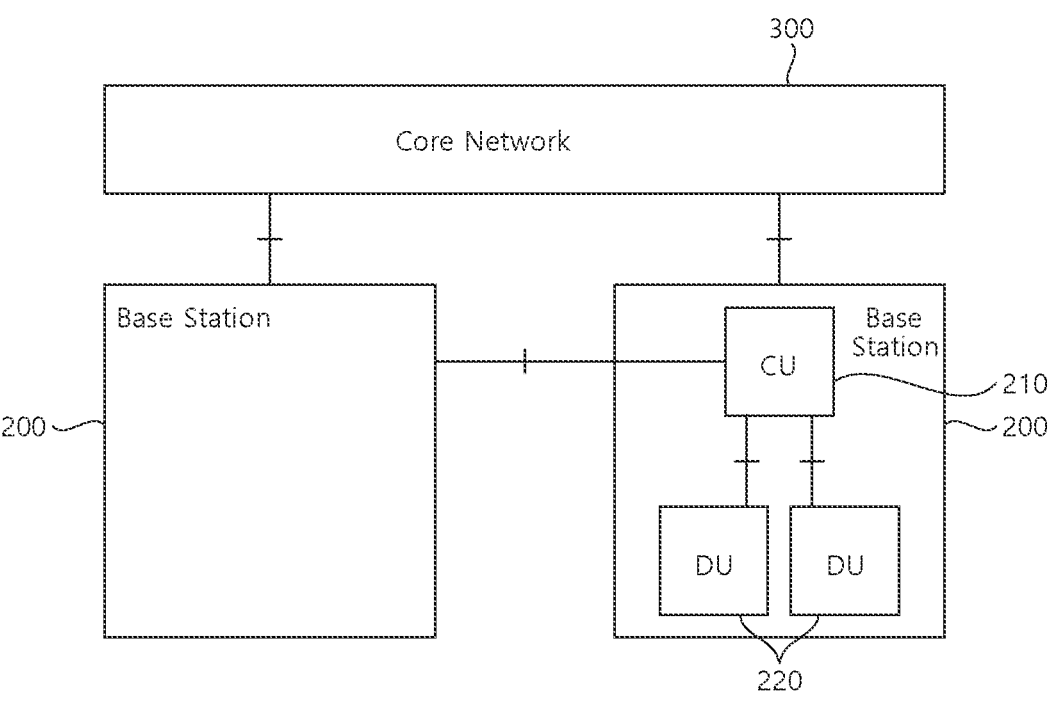
FIG. 5 shows an example of a network node to which implementations of the present disclosure is applied.

FIG. 5 shows an example of a network node to which implementations of the present disclosure is applied.

FIG. 5 is a diagram illustrating the second wireless device 200 of FIG. 2 or the wireless device 200 of FIG. 3 described above in more detail, when the base station is divided into a central unit (CU) and a distributed unit (DU).

Referring to FIG. 5, base station 200 may be connected to core network 300. Base stations 200 may be connected to each other. For example, an interface between the base station 200 and the core network 300 may be referred to as NG. For example, an interface between base stations 200 may be referred to as Xn.

Base station 200 may be divided into CU 210 and DU 220. That is, base station 200 may be hierarchically separated and operated. CU 210 may be connected to one or more DUs 220. For example, an interface between the CU 210 and the DU 220 may be referred to as F1. The CU 210 may perform a function of upper layers of the base station 200, and the DU 220 may perform a function of lower layers of the base station 200. For example, the CU 210 may be a logical node hosting RRC, SDAP, and PDCP layers of the base station 200 (e.g., gNB). Alternatively, the CU (210) may be a logical node hosting the RRC and PDCP layers of the base station 200 (e.g., ng-eNB). For example, DU 220 may be a logical node hosting the RLC, MAC and PHY layers of the base station.

The operation of DU 220 may be partially controlled by CU 210. One DU 220 may support one or more cells. One cell may be supported by only one DU 220. One DU 220 may be connected to one CU 210, and one DU 220 may be connected to a plurality of CUs 210 according to appropriate implementation.

Figure 6:
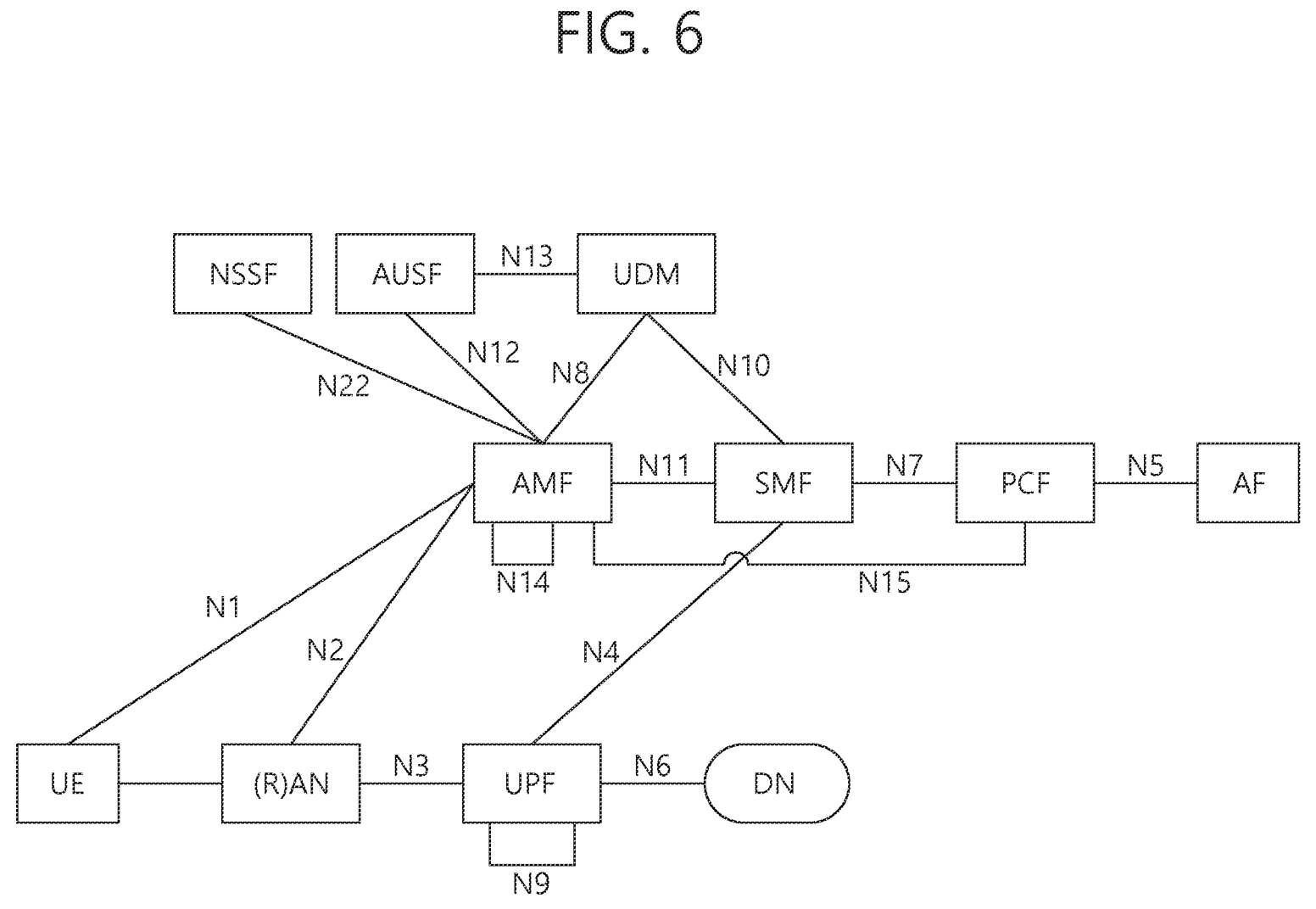

FIG. 6 shows an example of 5G system architecture to which implementations of the present disclosure is applied.

The 5G system (5GS) architecture consists of the following network functions (NF).

Authentication Server Function (AUSF)

Access and Mobility Management Function (AMF)

Data Network (DN), e.g., operator services, Internet access or 3rd party services Unstructured Data Storage Function (UDSF)

Network Exposure Function (NEF)

Intermediate NEF (I-NEF)

Network Repository Function (NRF)

Network Slice Selection Function (NSSF)

Policy Control Function (PCF)

Session Management Function (SMF)

Unified Data Management (UDM)

Unified Data Repository (UDR)

User Plane Function (UPF)

UE radio Capability Management Function (UCMF)

Application Function (AF)

User Equipment (UE)

(Radio) Access Network ((R)AN)

5G-Equipment Identity Register (5G-EIR)

Network Data Analytics Function (NWDAF)

CHarging Function (CHF)

Furthermore, the following network functions may be considered.

Non-3GPP InterWorking Function (N3IWF)

Trusted Non-3GPP Gateway Function (TNGF)

Wireline Access Gateway Function (W-AGF)

FIG. 6 depicts the 5G system architecture in the non-roaming case, using the reference point representation showing how various network functions interact with each other.

In FIG. 6, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 6. For clarity, the NWDAF and its connections with other NFs, e.g., PCF, are not depicted in FIG. 6.

The 5G system architecture contains the following reference points:

N1: Reference point between the UE and the AMF.

N2: Reference point between the (R)AN and the AMF.

N3: Reference point between the (R)AN and the UPF.

N4: Reference point between the SMF and the UPF.

N6: Reference point between the UPF and a Data Network.

N9: Reference point between two UPFs.

The following reference points show the interactions that exist between the NF services in the NFs.

N5: Reference point between the PCF and an AF.

N7: Reference point between the SMF and the PCF.

N8: Reference point between the UDM and the AMF.

N10: Reference point between the UDM and the SMF.

N11: Reference point between the AMF and the SMF.

N12: Reference point between the AMF and the AUSF.

N13: Reference point between the UDM and the AUSF.

N14: Reference point between two AMFs.

N15: Reference point between the PCF and the AMF in the case of non-roaming scenario, PCF in the visited network and AMF in the case of roaming scenario.

N16: Reference point between two SMFs, (in roaming case between SMF in the visited network and the SMF in the home network).

N22: Reference point between the AMF and the NSSF.

In some cases, a couple of NFs may need to be associated with each other to serve a UE.

A registration procedure is described. Section 4.2.2.2 of 3GPP TS 23.502 V16.3.0 (2019-12) can be referred.

Figure 7:
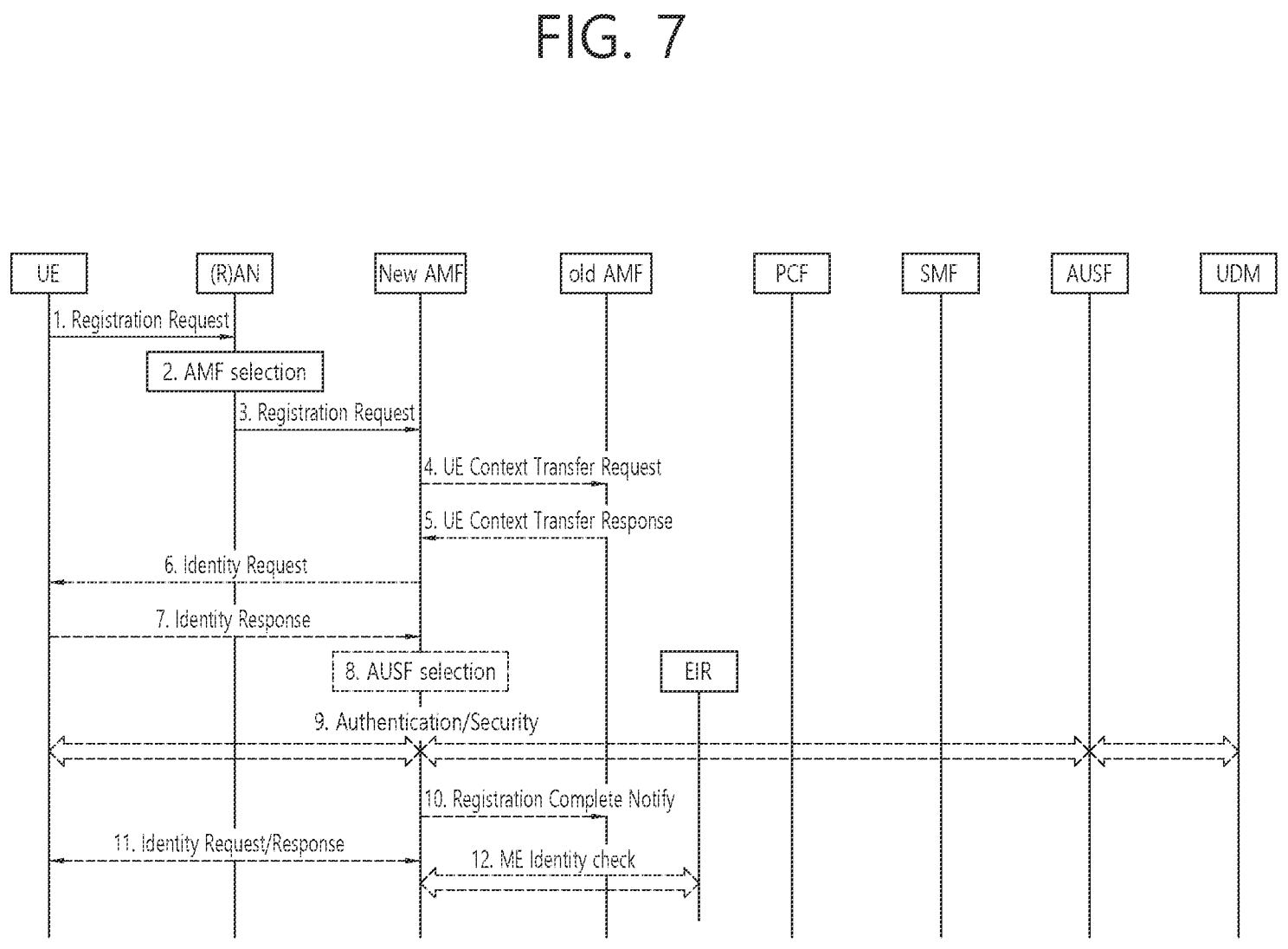
Figure 8:
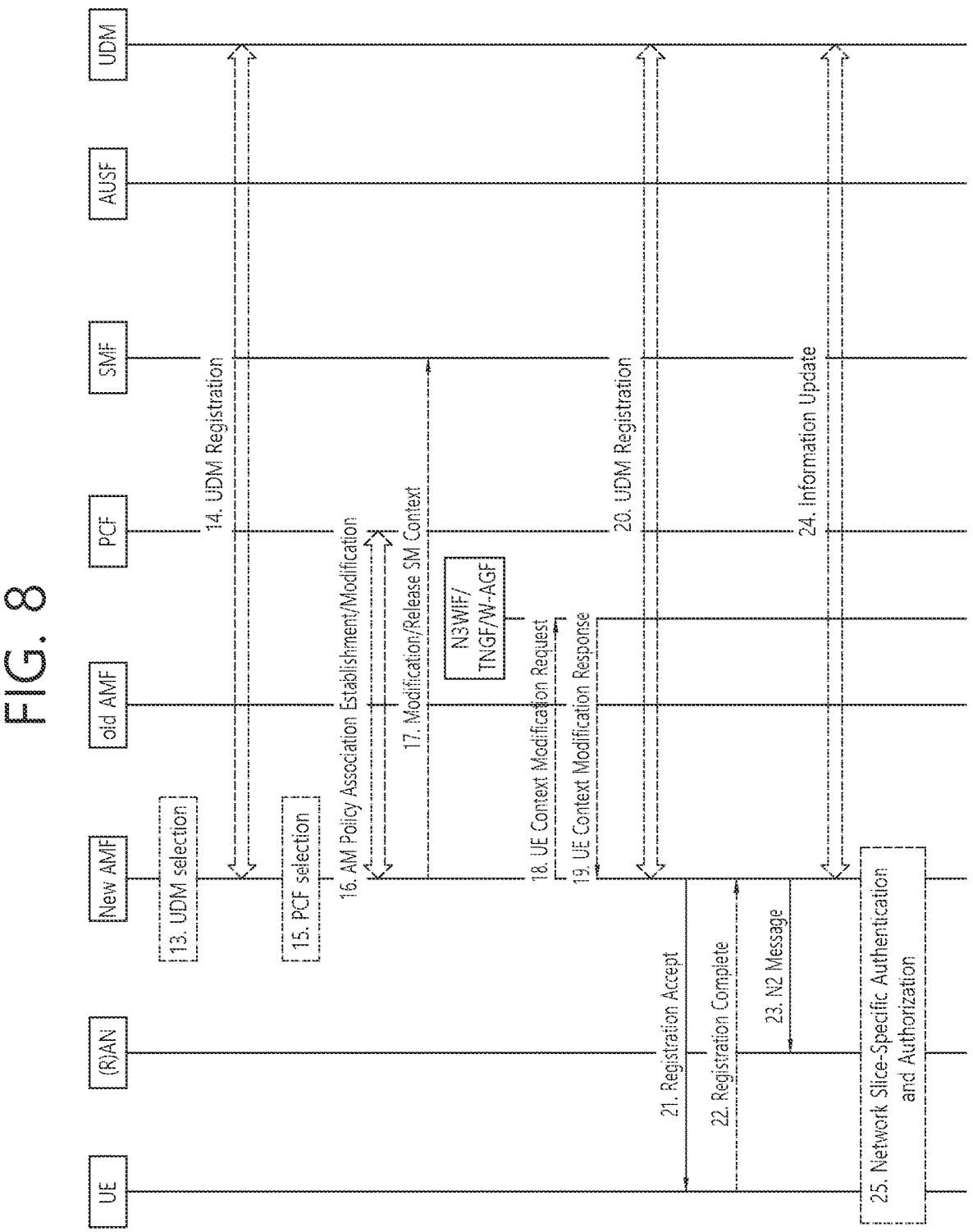

FIGS. 7 and 8 show an example of a registration procedure to which implementations of the present disclosure is applied.

A UE needs to register with the network to get authorized to receive services, to enable mobility tracking and to enable reachability. The UE initiates the registration procedure using one of the following registration types:

Initial registration to the 5GS: or

Mobility registration update; or

Periodic registration update; or

Emergency registration.

The general registration procedure in FIGS. 7 and 8 applies on all these registration procedures, but the periodic registration update need not include all parameters that are used in other registration cases.

The general registration procedure in FIGS. 7 and 8 is also used for the case of registration in 3GPP access when the UE is already registered in a non-3GPP access, and vice versa. Registration in 3GPP access when the UE is already registered in a non-3GPP access scenario may require an AMF change.

First, procedures of FIG. 7 are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGISTERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.

ii) a native 5G-GUTI assigned by the PLMN to which the UE is attempting to register, if available;

iii) a native 5G-GUTI assigned by an equivalent PLMN to the PLMN to which the UE is attempting to register, if available:

iv) a native 5G-GUTI assigned by any other PLMN, if available.

v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIG. 8, which follow the procedures of FIG. 7, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSMContext and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization procedure.

Support of non-3GPP access is described. Section 4.2.8.1 of 3GPP TS 23.501 V16.3.0 (2019-12) can be referred.

20

Figure 9:
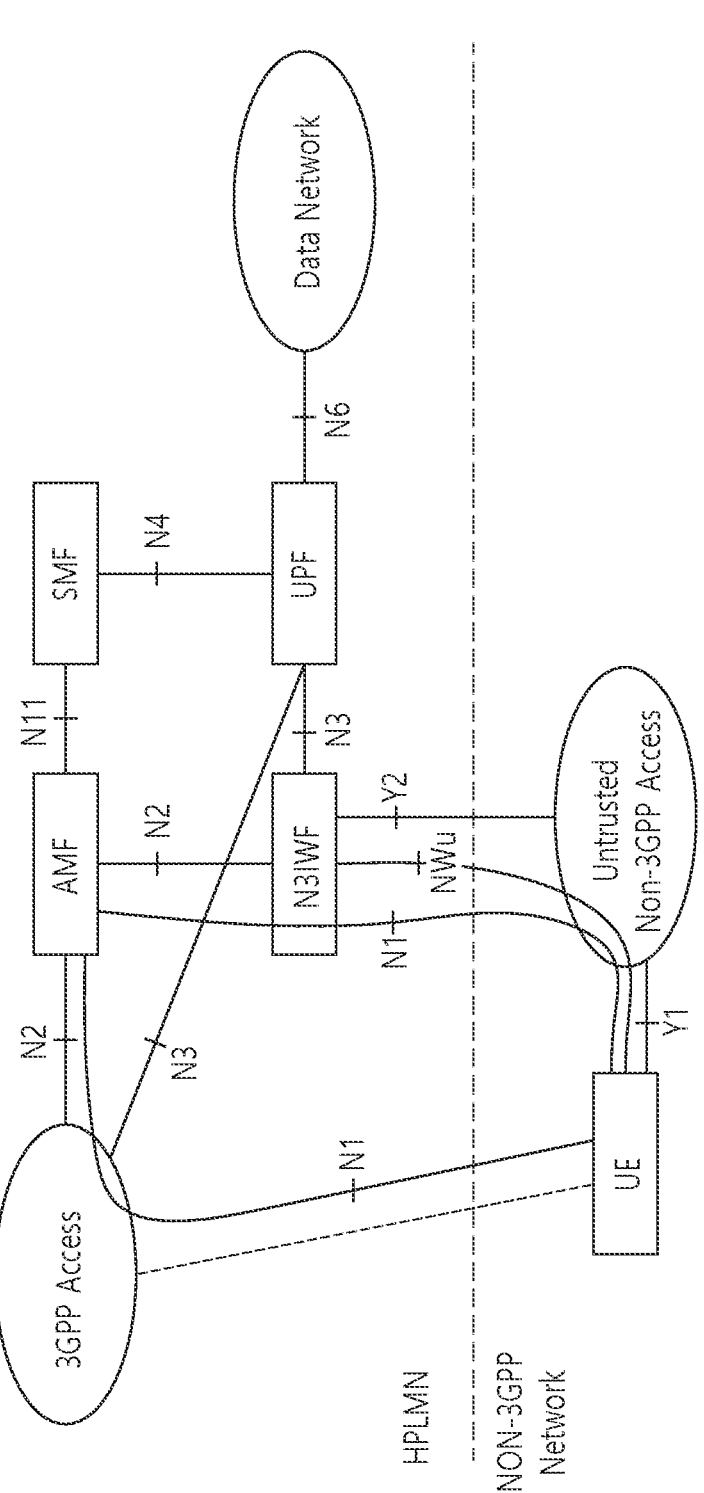
FIG. 9 shows an example of non-roaming architecture for 5GC with untrusted non-3GPP access to which implementations of the present disclosure is applied.

FIG. 9 shows an example of non-roaming architecture for 5GC with untrusted non-3GPP access to which implementations of the present disclosure is applied.

The 5G Core Network supports connectivity of UEs via non-3GPP access networks, e.g., wireless local area network (WLAN) access networks.

The 5G Core Network supports both untrusted non-3GPP access networks and trusted non-3GPP access networks (TNANs).

An untrusted non-3GPP access network shall be connected to the 5G Core Network via a N3IWF, whereas a trusted non-3GPP access network shall be connected to the 5G Core Network via a TNGF. Both the N3IWF and the TNGF interface with the 5G Core Network CP and UP functions via the N2 and N3 interfaces, respectively.

A non-3GPP access network may advertise the PLMNs for which it supports trusted connectivity and the type of supported trusted connectivity (e.g., "5G connectivity"). Therefore, the UEs can discover the non-3GPP access networks that can provide trusted connectivity to one or more PLMNs.

When the UE decides to use untrusted non-3GPP access to connect to a 5G Core Network in a PLMN:
the UE first selects and connects with a non-3GPP access network: and then
the UE selects a PLMN and an N3IWF in this PLMN. The PLMN/N3IWF selection and the non-3GPP access network selection are independent.

When the UE decides to use trusted non-3GPP access to connect to a 5G Core Network in a PLMN:
the UE first selects a PLMN; and then
the UE selects a non-3GPP access network (a TNAN) that supports trusted connectivity to the selected PLMN. In this case, the non-3GPP access network selection is affected by the PLMN selection.

A UE that accesses the 5G Core Network over a standalone non-3GPP access shall, after UE registration, support NAS signaling with 5G Core Network control-plane functions using the N1 reference point.

When a UE is connected via a NG-RAN and via a standalone non-3GPP access, multiple N1 instances shall exist for the UE, i.e., there shall be one N1 instance over NG-RAN and one N1 instance over non-3GPP access.

A UE simultaneously connected to the same 5G Core Network of a PLMN over a 3GPP access and a non-3GPP access shall be served by a single AMF in this 5G Core Network.

When a UE is connected to a 3GPP access of a PLMN, if the UE selects a N3IWF and the N3IWF is located in a PLMN different from the PLMN of the 3GPP access, e.g., in a different VPLMN or in the HPLMN, the UE is served separately by the two PLMNs. The UE is registered with two separate AMFs. PDU sessions over the 3GPP access are served by V-SMFs different from the V-SMF serving the PDU Sessions over the non-3GPP access. The same can be true when the UE uses trusted non-3GPP access, i.e., the UE may select one PLMN for 3GPP access and a different PLMN for trusted non-3GPP access.

The PLMN selection for the 3GPP access does not depend on the PLMN that is used for non-3GPP access. In other words, if a UE is registered with a PLMN over a non-3GPP access, the UE performs PLMN selection for the 3GPP access independently of this PLMN.

A UE shall establish an IPsec tunnel with the N3IWF or with the TNGF in order to register with the 5G Core Network over non-3GPP access.

It shall be possible to maintain the UE NAS signaling connection with the AMF over the non-3GPP access after all the PDU sessions for the UE over that access have been released or handed over to 3GPP access.

N1 NAS signaling over standalone non-3GPP accesses shall be protected with the same security mechanism applied for N1 over a 3GPP access.

Stand-alone non-public network (SNPN) is described. Section 5.30.2 of 3GPP TS 23.501 V16.3.0 (2019-12) can be referred.

An SNPN is operated by an NPN operator and not relying on network functions provided by a PLMN. On the other hand, a public network integrated (PNI) NPN is a non-public network deployed with the support of a PLMN.

SNPN 5GS deployments are based on the architecture depicted above in FIG. 6, the architecture for 5GC with untrusted non-3GPP access, described above in FIG. 9, for access to SNPN services via a PLMN (and vice versa) and the additional functionality described below.

Interworking with EPS is not supported for SNPN.

The combination of a PLMN ID and network identifier (NID) identifies an SNPN.

The NID shall support two assignment models:

Self-assignment: NIDs are chosen individually by SNPNs at deployment time (and may therefore not be unique) but use a different numbering space than the coordinated assignment NIDs.

Coordinated assignment: NIDs are assigned using one of the following two options:

1) The NID is assigned such that it is globally unique independent of the PLMN ID used, or 2) The NID is assigned such that the combination of the NID and the PLMN ID is globally unique.

An optional human-readable network name helps to identify an SNPN during manual SNPN selection.

When a UE is set to operate in SNPN access mode, the UE does not perform normal PLMN selection procedures.

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials.

For manual network selection, UEs operating in SNPN access mode provide to the user the list of NIDs and related human-readable names (if available) of the available SNPNs the UE has respective SUPI and credentials for.

When a UE performs initial registration to an SNPN, the UE shall indicate the selected NID and the corresponding PLMN ID to NG-RAN. NG-RAN shall inform the AMF of the selected PLMN ID and NID.

To access PLMN services, a UE in SNPN access mode that has successfully registered with an SNPN may perform another registration via the SNPN user plane with a PLMN (using the credentials of that PLMN) following the same architectural principles as specified above for the non-3GPP access and the SNPN taking the role of "Untrusted non-3GPP access" in FIG. 9.

To access SNPN services, a UE that has successfully registered with a PLMN may perform another registration via the PLMN user plane with an SNPN (using the credentials of that SNPN) following the same architectural principles as specified above for the non-3GPP access and the PLMN taking the role of "Untrusted non-3GPP access" in FIG. 9.

One of the goals for NPN improvement in 3GPP Rel-17 is, when a UE accesses a SNPN using credentials of a network (e.g., home service provider (SP)) that is separate from the SNPN, to support the service for the home SP through the connected SNPN. In this case, a UE in which mapping information between a home SP ID and an NPN ID is not sufficiently configured may unnecessarily and repeatedly transmit a registration request to the network in order to receive a service from a specific home SP.

In addition, another one of the goals for NPN enhancement in 3GPP Rel-17 is to provide credentials for NPNs through other networks in a situation where a UE does not have credentials for an NPN to be served. This may be referred to as UE onboarding and remote provisioning. Based on the PNI-NPN ID for onboarding (e.g. closed access group (CAG) ID) broadcasted by the NG-RAN through system information, the UE may request provisioning server routing information from the on-boarding information mapping function (OIMF). In this case, onboarding for the UE may not be supported because routing information configured according to the CAG ID sent by the UE does not exist in the OIMF.

1. First Implementation

According to the first implementation of the present disclosure, a method for preventing a situation where a UE in which mapping information between a home SP ID and an NPN ID is not sufficiently configured unnecessarily repeatedly transmits a registration request to a network in order to receive a service from a specific home SP is provided. Hereinafter, a UE in which mapping information between a home SP ID and an NPN ID is not sufficiently configured may be referred to as an underconfigured UE. The underconfigured UE means a UE that has not received through a pre-configuration which SNPN can be selected to receive a service from the home SP.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 10 shows an example of a method performed by a UE to which the first implementation of the present disclosure is applied.

In step S1000, the method comprises receiving system information from a SNPN. The system information includes information about whether the SNPN supports an underconfigured UE. The underconfigured UE is a UE that has not received through a pre-configuration which SNPN can be selected to receive a service from a home SP.

In some implementations, the system information may include an ID of the SNPN.

In step S1010, the method comprises transmitting a first registration request message to the SNPN based on the information about whether the SNPN supports the underconfigured UE. The first registration request message includes an identifier (ID) of a home SP from which the UE intends to receive service.

In some implementations, the first registration request message may include credentials of the home SP from which the UE intends to receive service.

In some implementations, the home SP from which the UE intends to receive service may be a home SP that has not established a service level agreement (SLA) with an AMF of the SNPN.

In step S1020, the method comprises receiving a registration reject message from the SNPN in response to the first registration request message. The registration reject message includes information about home SPs supported by the SNPN.

In some implementations, the home SPs supported by the SNPN may be a home SP that has established an SLA with an AMF of the SNPN.

In step S1030, the method comprises selecting at least one home SP from which the UE intends to receive service from among the home SPs supported by the SNPN.

In step S1040, the method comprises transmitting a second registration request message including an ID of the selected home SP to the SNPN.

In some implementations, the second registration request message may include credentials of the selected home SP.

In some implementations, authentication of the UE may be performed through AUSF and UDM of the selected home SP based on the ID of the selected home SP. Based on the authentication of the UE being completed, a registration accept message may be received from the SNPN in response to the second registration request message.

In some implementations, the UE may be in communication with at least one of a mobile device, a network, and/or autonomous vehicles other than the UE.

Furthermore, the method in perspective of the UE described above in FIG. 10 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions to cause the at least one processor to perform operations below.

The UE receives, via the at least one transceiver, system information from a SNPN. The system information includes information about whether the SNPN supports an underconfigured UE. The underconfigured UE is a UE that has not received through a pre-configuration which SNPN can be selected to receive a service from a home SP.

In some implementations, the system information may include an ID of the SNPN.

The UE transmits, via the at least one transceiver, a first registration request message to the SNPN based on the information about whether the SNPN supports the under-configured UE. The first registration request message includes an identifier (ID) of a home SP from which the UE intends to receive service.

In some implementations, the first registration request message may include credentials of the home SP from which the UE intends to receive service.

In some implementations, the home SP from which UE intends to receive service may be a home SP that has not established an SLA with an AMF of the SNPN.

The UE receives, via the at least one transceiver, a registration reject message from the SNPN in response to the first registration request message. The registration reject message includes information about home SPs supported by the SNPN.

In some implementations, the home SPs supported by the SNPN may be a home SP that has established an SLA with an AMF of the SNPN.

The UE selects at least one home SP from which the UE intends to receive service from among the home SPs supported by the SNPN.

The UE transmits, via the at least one transceiver, a second registration request message including an ID of the selected home SP to the SNPN.

In some implementations, the second registration request message may include credentials of the selected home SP.

In some implementations, authentication of the UE may be performed through AUSF and UDM of the selected home SP based on the ID of the selected home SP. Based on the authentication of the UE being completed, a registration accept message may be received from the SNPN in response to the second registration request message.

Furthermore, the method in perspective of the UE described above in FIG. 10 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: obtaining system information, generating a first registration request message based on the information about whether the SNPN supports the underconfigured UE, obtaining a registration reject message in response to the first registration request message, selecting at least one home SP from which the UE intends to receive service from among the home SPs supported by the SNPN, and generating a second registration request message including an ID of the selected home SP. The system information includes information about whether a SNPN supports an underconfigured UE, and the underconfigured UE is a UE that has not received through a pre-configuration which SNPN can be selected to receive a service from a home SP, the first registration request message includes an ID of a home SP from which the UE intends to receive service. The registration reject message includes information about home SPs supported by the SNPN.

Furthermore, the method in perspective of the UE described above in FIG. 10 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM). ROM, non-volatile random access memory (NVRAM). EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically. CRM stores instructions to cause at least one processor to perform operations. The operations comprise: obtaining system information, generating a first registration request message based on the information about whether the SNPN supports the underconfigured UE, obtaining a registration reject message in response to the first registration request message, selecting at least one home SP from which the UE intends to receive service from among the home SPs supported by the SNPN, and generating a second registration request message including an ID of the selected home SP. The system information includes information about whether a SNPN supports an underconfigured UE, and the underconfigured UE is a UE that has not received through a pre-configuration which SNPN can be selected to receive a service from a home SP, the first registration request message includes an ID of a home SP from which the UE intends to receive service. The registration reject message includes information about home SPs supported by the SNPN.

FIG. 11 shows an example of a method performed by a base station to which the first implementation of the present disclosure is applied.

In step S1100, the method comprises transmitting system information to a UE. The system information includes information about whether a SNPN supports an underconfigured UE. The underconfigured UE is a UE that has not received through a pre-configuration which SNPN can be selected to receive a service from a home SP.

In some implementations, the system information may include an ID of the SNPN.

In step S1110, the method comprises receiving a first registration request message from the UE. The first registration request message includes an ID of a home SP from which the UE intends to receive service.

In some implementations, the first registration request message may include credentials of the home SP from which the UE intends to receive service.

In some implementations, the home SP from which the UE intends to receive service may be a home SP that has not established an SLA with an AMF of the SNPN.

In step S1120, the method comprises transmitting a registration reject message to the UE in response to the first registration request message. The registration reject message includes information about home SPs supported by the SNPN.

In some implementations, the home SPs supported by the SNPN may be a home SP that has established an SLA with an AMF of the SNPN.

In step S1130, the method comprises receiving, from the UE, a second registration request message including an ID of a home SP selected by the UE from among the home SPs supported by the SNPN.

In some implementations, the second registration request message may include credentials of the selected home SP.

In some implementations, authentication of the UE may be performed through AUSF and UDM of the selected home SP based on the ID of the selected home SP. Based on the authentication of the UE being completed, a registration accept message may be transmitted to the UE in response to the second registration request message.

Furthermore, the method in perspective of the base station described above in FIG. 11 may be performed by the second wireless device 200 shown in FIG. 2, the wireless device 200 shown in FIG. 3, and/or the network node 200 shown in FIG. 5.

More specifically, the base station comprises at least one transceiver, at least one processor, and at least one memory operably connectable to the at least one processor. The at least one memory stores instructions to cause the at least one processor to perform operations below.

The base station transmits, via the at least one transceiver, system information to a UE. The system information includes information about whether a SNPN supports an underconfigured UE. The underconfigured UE is a UE that has not received through a pre-configuration which SNPN can be selected to receive a service from a home SP.

In some implementations, the system information may include an ID of the SNPN.

The base station receives, via the at least one transceiver, a first registration request message from the UE. The first registration request message includes an ID of a home SP from which the UE intends to receive service.

In some implementations, the first registration request message may include credentials of the home SP from which the UE intends to receive service.

In some implementations, the home SP from which the UE intends to receive service may be a home SP that has not established an SLA with an AMF of the SNPN.

The base station transmits, via the at least one transceiver, a registration reject message to the UE in response to the first registration request message. The registration reject message includes information about home SPs supported by the SNPN.

In some implementations, the home SPs supported by the SNPN may be a home SP that has established an SLA with an AMF of the SNPN.

The base station receives, from the UE via the at least one transceiver, a second registration request message including an ID of a home SP selected by the UE from among the home SPs supported by the SNPN.

In some implementations, the second registration request message may include credentials of the selected home SP.

In some implementations, authentication of the UE may be performed through AUSF and UDM of the selected home SP based on the ID of the selected home SP. Based on the authentication of the UE being completed, a registration accept message may be transmitted to the UE in response to the second registration request message.

Figure 12:
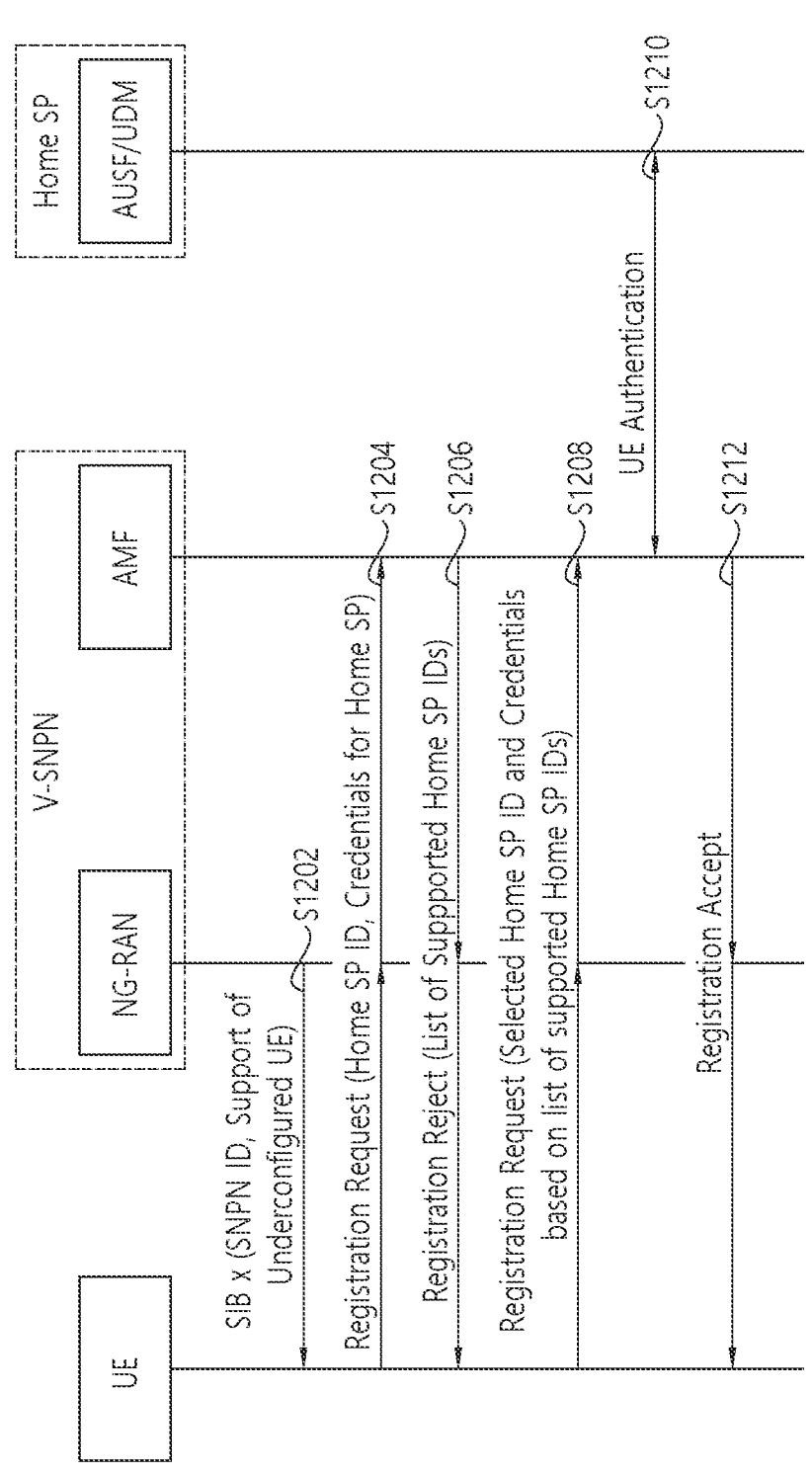
FIG. 12 shows an example of a method of notifying a UE of a list of home SP IDs supported by SNPN during a registration procedure to which the first implementation of the present disclosure is applied.

FIG. 12 shows an example of a method of notifying a UE of a list of home SP IDs supported by SNPN during a registration procedure to which the first implementation of the present disclosure is applied.

In FIG. 12, it is assumed that a specific home SP has established an SLA with one or more SNPNs. Based on this, the UE may use the service of a specific home SP through the SNPN with which the SLA has been established. In order to receive service from a specific home SP, information about which SNPN to select may be pre-configured in the UE. However, in FIG. 12, information on such a SNPN may not be previously configured (i.e., an underconfigured UE).

In step S1202, the NG-RAN of the SNPN (e.g., visited SNPN (V-SNPN)) notifies the UE of whether the SNPN supports an underconfigured UE and the SNPN ID supported by the NG-RAN through system information (e.g., SIB x).

In step S1204, if the corresponding SNPN supports the underconfigured UE, even though the UE does not have information about which home SP ID the UE can receive service from through the corresponding SNPN (e.g., not pre-configured), or the UE cannot receive service from the desired home SP through the corresponding SNPN, a registration request procedure may be initiated for the corresponding SNPN. The UE transmits to the SNPN a registration request message including home SP ID and credentials to receive service.

Alternatively, the registration request message may include a list of home SP IDs for which the UE requests a list of all home SPs to which the UE intends to access, instead of the home SP ID to receive service.

In step S1206, if the home SP from which the UE wants to receive service is not the home SP that has established an SLA with the AMF of the corresponding SNPN, the SNPN responds to the registration request message with a registration reject message. In this case, in order to reduce repeated registration requests of the UE, the registration reject message may include a list of home SP IDs (i.e., a list of home SP IDs supported by the corresponding SNPN) with which the AMF of the corresponding SNPN has established an SLA.

When a list of all home SPs to which the UE wishes to access is received instead of the ID of the home SP to which the UE wishes to receive service through the registration request message, the AMF of the corresponding SNPN may accept the UE's registration request by selecting a home SP ID with which an SLA has been established among all home SPs to which the UE wishes to access. If an SLA has not been established with any of home SPs to which the UE wishes to access, as described in step S1206, the AMF of the corresponding SNPN may transmit a registration reject message including a list of home SP IDs (i.e., a list of home SP IDs supported by the corresponding SNPN) with which the AMF of the corresponding SNPN has established an SLA.

In step S1208, the UE selects a home SP ID that the UE wants to receive service from among the list of home SP IDs supported by the corresponding SNPN, and transmits a registration request message including the selected home SP ID and credentials for the selected home SP ID to the SNPN.

In step S1210, the AMF of the corresponding SNPN accesses the AUSF and UDM of the home SP network using the home SP ID and credential received from the UE, and then performs authentication on the UE.

In step S1212, when authentication of the UE through the home SP network is completed, the AMF of the corresponding SNPN transmits a registration accept message to the UE.

According to the first implementation of the present specification, a network can inform a UE of a list other networks (home SP ID list) capable of providing services through a SNPN by establishing an SLA with the corresponding SNPN. Accordingly, the UE can avoid continuously requesting registration with a SNPN that cannot provide services of a specific home SP.

2. Second Implementation

According to the second implementation of the present disclosure, a method in which a network provides services to other networks according to a network configuration situation, and at the same time, prevents a UE from sending an erroneous registration request based thereon is provided.

Figure 13:
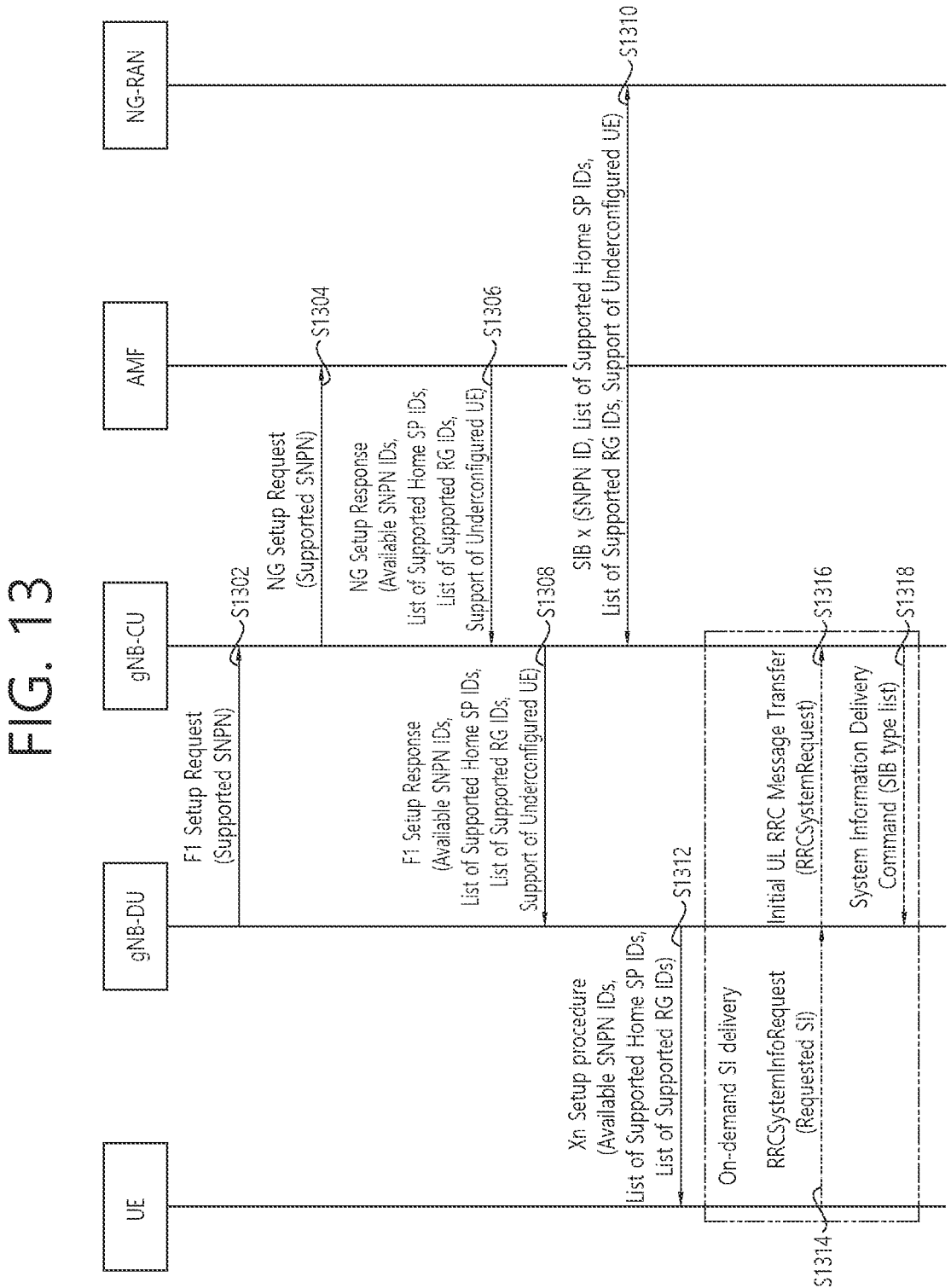
FIG. 13 shows an example of a method for exchanging home SP related information between an NG-RAN and a 5GC during an interface setup procedure or an interface configuration update procedure according to the second implementation of the present disclosure.

FIG. 13 shows an example of a method for exchanging home SP related information between an NG-RAN and a 5GC during an interface setup procedure or an interface configuration update procedure according to the second implementation of the present disclosure.

In FIG. 13, a method is provided in which the core network notifies the wireless network of the list of home SPs with which an SLA has been established and delivers the information to the UE in the form of SIB. In addition, in order to support a case in which mapping information between a home SP ID and an NPN ID is not sufficiently configured to the UE (i.e., an underconfigured UE), a method for notifying the UE that it can access the network is provided.

In FIG. 13, it is assumed that a specific home SP has established an SLA with one or more SNPNs. Based on this, the UE may use the service of a specific home SP through the SNPN with which the SLA has been established. In order to receive service from a specific home SP, information about which SNPN to select may be pre-configured in the UE. However, in FIG. 13, information on such a SNPN may not be previously configured (i.e., an underconfigured UE).

In step S1302, the gNB-DU transmits an F1 Setup Request message to the gNB-CU based on TNL connectivity to create an F1 interface with the gNB-CU. The F1 Setup Request message may include a list of SNPNs supported by the gNB-DU.

In step S1304, to ensure connectivity to 5GC, the gNB-CU transmits an NG Setup Request message to the AMF. The NG Setup Request message may include a list of SNPNs supported by the gNB.

In step S1306, in response to the NG Setup Request message, the AMF transmits to the gNB an NG Setup Response message including only SNPN IDs that the corresponding AMF can support from among the SNPN list received from the gNB.

The NG Setup Response message may include a list of home SP IDs with which the corresponding AMF has established an SLA (i.e., a list of home SP IDs supported).

The NG Setup Response message may include information about whether to support an underconfigured UE, i.e., a UE which is not sufficiently preconfigured with information about which SNPN ID should be selected to receive service from a specific home SP. Upon receiving information that the network supports the underconfigured UE, the UE may initiate a registration procedure with the corresponding SNPN even if there is no information about whether or not to select a SNPN supported by the corresponding network in order to receive service from a specific home SP.

The NG Setup Response message may include IDs of supported roaming groups (RGs), instead of individually including a plurality of supported home SP IDs. RG is a grouping of home SPs to which the corresponding SNPN can be connected.

If there is already an NG connection between the gNB and the AMF before step S1304/S1306, a RAN Configuration Update message and a RAN Configuration Update Acknowledge message may be used instead of the NG Setup Request/Response message disclosed in step S1304/S1306.

In step S1308, the gNB-CU transfers the information received from the AMF to the gNB-DU through the F1 Setup Response message.

Information about supported home SP ID or RG ID may be pre-configured in the gNB-DU. Information about this may be delivered to the AMF through steps S1302 and S1304. Among them, the home SP ID or RG ID with which the corresponding AMF has established an SLA may be delivered to the gNB-CU and gNB-DU through steps S1306/S1308.

The list of supported home SP IDs and/or supported RG IDs may be encoded in the gNB-CU and included in the F1 Setup Response message in the form of SIB x (e.g., SIB2, 3, 4 . . . ).

In step S1310, the gNB-CU delivers a list of available SNPN IDs, supported home SP IDs, and/or supported RG IDs to the neighboring NG-RAN through the Xn Setup procedure.

In step S1312, the gNB-DU transmits the information received in step S1308 to the UE through system information. When a list of supported home SP IDs and/or a list of supported RG IDs is received from the gNB-CU in the form of SIBs (e.g., SIB2, 3, 4 . . . ) encoded by the gNB-CU, the gNB-DU may transmit the SIBs (e.g., SIB2, 3, 4 . . . ) received from the gNB-CU to the UE as it is. If the list of supported home SP IDs and/or the list of supported RG IDs are to be transmitted to the UE via SIBs (e.g., SIB1, 10 . . . ) encoded in the gNB-DU, the gNB-DU may encode the information received from the gNB-CU into SIB and transmit it to the UE.

System information transmitted to the UE may include information about whether to support the underconfigured UE.

Alternatively, instead of continuously announcing the list of supported home SP IDs and/or the list of supported RG IDs through SIB x, the gNB-DU may inform only information about the SNPN ID supported by the SNPN and whether the underconfigured UE is supported through SIB1. The UE needing a list of supported home SP IDs and/or a list of supported RG IDs may request broadcasting of SIB x including the corresponding information from the gNB-CU through an RRCSystemInfoRequest message or another RRC message in step S1314. In step S1316, the gNB-DU may transmit an RRCSystemInfoRequest message or another RRC message to the gNB-CU through an Initial UL RRC Message Transfer message. In step S138, upon receiving the RRCSystemInfoRequest message or another RRC message, the gNB-CU may request broadcasting of SIB x including the corresponding information from the gNB-DU through a system information delivery command message.

According to the second implementation of the present disclosure, the core network can deliver a list of other networks (home SP ID list) with which the corresponding SNPN has established an SLA to the wireless network, and the wireless network can deliver the list to the UE through the SIB. In order to receive service from a specific home SP, the UE can request registration by selecting a corresponding SNPN by referring to the SIB.

3. Third Implementation

According to the third implementation of the present disclosure, a method for maintaining a mapping table between a specific CAG and a provisioning server for UE onboarding is provided. Specifically, according to the CAG ID supported by the NG-RAN, OIMF may update routing information for the provisioning server. Conversely, the CAG ID configured in the provisioning server may be delivered to the NG-RAN, and the corresponding CAG ID may be transmitted to the UE.

FIG. 14 shows an example of a method of updating a mapping table between a CAG ID and provisioning server routing information in an OIMF initiated by a gNB according to the third implementation of the present disclosure.

In FIG. 14, the CAG ID supported by the wireless network is transmitted to the OIMF, and routing information to the provisioning server may be updated accordingly. The UE may select a provisioning server based on the CAG ID delivered by the wireless network through the SIB.

In step S1402, the gNB-DU transmits an F1 Setup Request message based on TNL connectivity to the gNB-CU to create an F1 interface with the gNB-CU. The F1 Setup Request message may include the CAG ID supported by the gNB-DU.

In step S1404, to ensure connectivity to 5GC, the gNB-CU transmits an NG Setup Request message to the AMF. The NG Setup Request message may include a CAG ID supported by the gNB.

In step S1406, the AMF transmits a Configuration Update message or a new message including the CAG ID received from the gNB to the OIMF to update the mapping table between the CAG ID and provisioning server routing information existing in the OIMF based on the CAG ID supported by the gNB.

In step S1408, the OIMF updates the mapping table between CAG ID and provisioning server routing information based on the CAG ID received from the AMF.

In step S1410, the OIMF transmits a Configuration Update Acknowledge message or a new message to inform the AMF that the corresponding mapping table has been updated.

In step S1412, the AMF responds to the gNB-CU through an NG Setup Response message.

In step S1414, the gNB-CU responds to the gNB-DU through an F1 Setup Response message.

Figure 15:
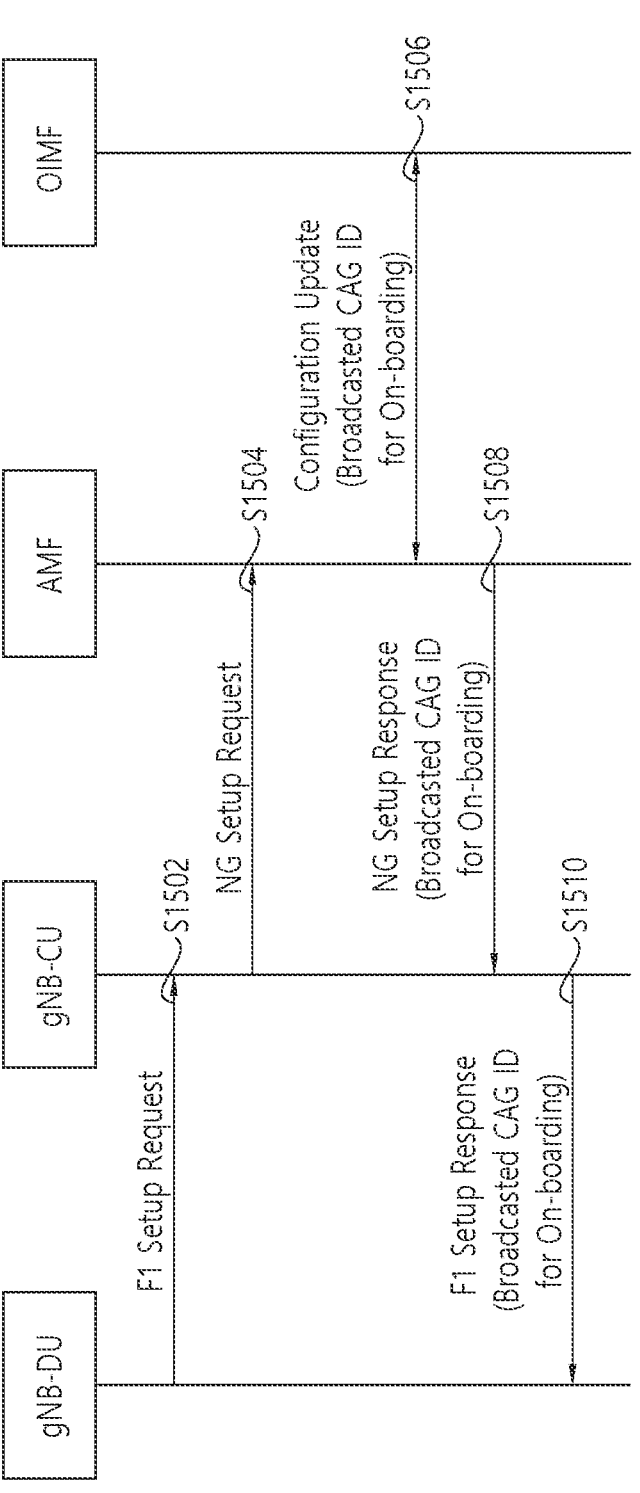
FIG. 15 shows an example of a method of updating a mapping table between a CAG ID and provisioning server routing information in an OIMF initiated by the OIMF according to the third implementation of the present disclosure.

FIG. 15 shows an example of a method of updating a mapping table between a CAG ID and provisioning server routing information in an OIMF initiated by the OIMF according to the third implementation of the present disclosure.

In FIG. 15, based on the mapping table set in the OIMF, the CAG ID for onboarding is known to the wireless network and can be delivered to the UE through the SIB. Based on this, the UE can select a provisioning server for onboarding.

In step S1502, the gNB-DU transmits an F1 Setup Request message based on TNL connectivity to the gNB-CU to create an F1 interface with the gNB-CU.

In step S1504, to ensure connectivity to 5GC, the gNB-CU transmits an NG Setup Request message to the AMF.

In step S1506, the OIMF notifies the AMF of CAG ID information constituting a mapping table between the CAG ID and provisioning server routing information existing in the OIMF through a configuration update procedure or a new procedure. The CAG ID information is finally delivered to the UE via the AMF and the gNB, and this is to inform the UE that on-boarding through the corresponding CAG ID is possible.

Step S1506 may be performed before steps S1502 and/or S1504.

In step S1508, the AMF transmits the CAG ID information received from the OIMF to the gNB through an NG Setup Response message.

If there is already an NG connection between the gNB and the AMF before step S1504, a RAN configuration update message and a RAN configuration update acknowledge message may be used instead of the NG Setup Request/Response messages disclosed in steps S1504/S1508.

In step S1510, the gNB-CU transmits the CAG ID information received from the AMF to the gNB-DU through the F1 Setup Response message. Thereafter, the gNB-DU encodes the CAG ID information received from the gNB-CU in the form of SIB x (e.g., SIB1, 10 . . . ) and transmits it to the UE.

If the CAG ID information received from the AMF is to be transmitted through the SIB encoded in the gNB-CU (e.g., SIB2, 3, 4 . . . ), the gNB-CU may deliver the encoded SIB including the CAG ID information to the gNB-DU through the F1 Setup Response message, and the gNB-DU may transmit it to the UE.

According to the third implementation of the present disclosure, routing information for the provisioning server can be updated according to a CAG ID supported by the wireless network, or, conversely, the CAG ID configured in the provisioning server can be transmitted to the UE. Accordingly, the UE can select a provisioning server for onboarding according to the CAG ID informed by the wireless network.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

acquiring, by a user equipment (UE), system information from a base station, wherein the system information includes i) an identity (ID) of a stand-alone non-public network (SNPN) the base station provides access to, and ii) information informing whether the SNPN allows registration attempts with credentials from a credential holder from the UE that is not explicitly configured to select the SNPN;

transmitting, by the UE, a first registration request message to the SNPN based on the information informing that the SNPN allows registration attempts with credentials from the credential holder from the UE that is not explicitly configured to select the SNPN, wherein the first registration request message includes an identifier (ID) of a home service provider (SP) from which the UE intends to receive service through the SNPN and credentials for the home SP;

based on a service level agreement (SLA) not being established between the home SP and the SNPN, receiving, by the UE, a registration reject message from the SNPN in response to the first registration request message, wherein the registration reject message includes information related to home SPs supported by the SNPN;

selecting, by the UE, at least one home SP among the home SPs supported by the SNPN; and transmitting, by the UE, a second registration request message including an ID of the selected home SP and credentials for the selected home SP to the SNPN.

2. The method of claim 1, wherein the home SPs supported by the SNPN have established an SLA with the SNPN.

3. The method of claim 1, wherein authentication of the UE is performed through Authentication Server Function (AUSF) and Unified Data Management (UDM) of the selected home SP based on the ID of the selected home SP.

4. The method of claim 3, wherein, based on the authentication of the UE being completed, a registration accept message is received from the SNPN in response to the second registration request message.

5. The method of claim 1, wherein the UE is in communication with at least one of a mobile device, a network, and/or autonomous vehicles other than the UE.

6. A user equipment (UE) comprising:

at least one transceiver;

at least one processor; and at least one memory operably connectable to the at least one processor and storing instructions that, based on being executed by the at least one processor, perform operations comprising:

acquiring, via the at least one transceiver, system information from a base station, wherein the system information includes i) an identity (ID) of a stand-alone non-public network (SNPN) the base station provides access to, and ii) information informing whether the SNPN allows registration attempts with credentials from a credential holder from the UE that is not explicitly configured to select the SNPN;

transmitting, via the at least one transceiver, a first registration request message to the SNPN based on the information informing that the SNPN allows registration attempts with credentials from the credential holder from the UE that is not explicitly configured to select the SNPN, wherein the first registration request message includes an identifier (ID) of a home service provider (SP) from which the UE intends to receive service through the SNPN and credentials for the home SP;

based on a service level agreement (SLA) not being established between the home SP and the SNPN, receiving, via the at least one transceiver, a registration reject message from the SNPN in response to the first registration request message, wherein the registration reject message includes information related to home SPs supported by the SNPN;

selecting at least one home SP among the home SPs supported by the SNPN; and transmitting, via the at least one transceiver, a second registration request message including an ID of the selected home SP and credentials for the selected home SP to the SNPN.

7. A base station comprising:

at least one transceiver;

at least one processor; and at least one memory operably connectable to the at least one processor and storing instructions that, based on being executed by the at least one processor, perform operations comprising:

transmitting, via the at least one transceiver, system information to a user equipment (UE), wherein the system information includes i) an identity (ID) of a stand-alone non-public network (SNPN) the base station provides access to, and ii) information informing whether the SNPN allows registration attempts with credentials from a credential holder from the UE that is not explicitly configured to select the SNPN;

receiving, via the at least one transceiver, a first registration request message from the UE based on the information informing that the SNPN allows registration attempts with credentials from the credential holder from the UE that is not explicitly configured to select the SNPN, wherein the first registration request message includes an identifier (ID) of a home service provider (SP) from which the UE intends to receive service through the SNPN and credentials for the home SP;

based on a service level agreement (SLA) not being established between the home SP and the SNPN, transmitting, via the at least one transceiver, a registration reject message to the UE in response to the first registration request message, wherein the registration reject message includes information related to home SPs supported by the SNPN; and receiving, from the UE via the at least one transceiver, a second registration request message including an ID of a home SP selected by the UE among the home SPs supported by the SNPN and credentials for the selected home SP.

* * * * *